US011630359B2

(12) United States Patent
Du et al.

(10) Patent No.: US 11,630,359 B2
(45) Date of Patent: Apr. 18, 2023

(54) DISPLAY SUBSTRATE AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Ruifang Du, Beijing (CN); Fengzhen Lyu, Beijing (CN); Hui Li, Beijing (CN); Xiaoye Ma, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 494 days.

(21) Appl. No.: 16/473,761

(22) PCT Filed: Dec. 27, 2018

(86) PCT No.: PCT/CN2018/124406
§ 371 (c)(1),
(2) Date: Jun. 26, 2019

(87) PCT Pub. No.: WO2019/200964
PCT Pub. Date: Oct. 24, 2019

(65) Prior Publication Data
US 2021/0011316 A1 Jan. 14, 2021

(30) Foreign Application Priority Data
Apr. 19, 2018 (CN) .......................... 201820558924.7

(51) Int. Cl.
G02F 1/1368 (2006.01)
G02F 1/1362 (2006.01)
G02F 1/1343 (2006.01)

(52) U.S. Cl.
CPC ...... *G02F 1/1368* (2013.01); *G02F 1/136286* (2013.01); *G02F 1/134318* (2021.01);
(Continued)

(58) Field of Classification Search
CPC ........................... G02F 1/13338; G06F 3/0412
See application file for complete search history.

(56) References Cited

U.S. PATENT DOCUMENTS

2015/0236042 A1* 8/2015 Peng ..................... G02F 1/1368
257/72
2015/0338708 A1 11/2015 Li et al.
(Continued)

FOREIGN PATENT DOCUMENTS

CN 1908786 A 2/2007
CN 103018980 A 4/2013
(Continued)

OTHER PUBLICATIONS

International Search Report and Written Opinion for International Appl. No. PCT/CN2018/124406, dated Mar. 27, 2019.

Primary Examiner — Alexander P Gross
(74) Attorney, Agent, or Firm — The Webb Law Firm

(57) ABSTRACT

The present disclosure provides a display substrate and a display device. The display substrate includes a common electrode. The common electrode includes an electrode unit array. The electrode unit array includes a plurality of electrode units. Each of the electrode units corresponds to two adjacent sub-pixels. Each of the electrode units includes a boundary electrode line and an inner region defined by the boundary electrode line. The inner region includes a first region and a second region. The first region includes a plurality of first strip electrode lines having a same longitudinal direction. Two adjacent first strip electrode lines are not connected inside the first region. The second region includes a plurality of second strip electrode lines having a
(Continued)

same longitudinal direction. Two adjacent second strip electrode lines are not connected inside the second region.

7 Claims, 8 Drawing Sheets

(52) U.S. Cl.
CPC .. *G02F 1/134372* (2021.01); *G02F 2201/121* (2013.01); *G02F 2201/123* (2013.01)

(56) References Cited

U.S. PATENT DOCUMENTS

| | | |
|---|---|---|
| 2017/0336681 A1 | 11/2017 | Jia et al. |
| 2018/0101039 A1 | 4/2018 | Lin et al. |
| 2019/0050100 A1* | 2/2019 | Ma .................... G02F 1/136286 |
| 2019/0079620 A1* | 3/2019 | Yoshida .............. G02F 1/13338 |
| 2019/0272057 A1* | 9/2019 | Chen .................... G06F 3/0416 |

FOREIGN PATENT DOCUMENTS

| | | | | |
|---|---|---|---|---|
| CN | 202916553 U | 5/2013 | | |
| CN | 105278180 A | 1/2016 | | |
| CN | 107238984 A | 10/2017 | | |
| CN | 208013633 U | 10/2018 | | |
| JP | 2010-113264 A | 5/2010 | | |
| KR | 20100058976 A | * | 6/2010 | ....... G02F 1/134363 |
| KR | 20130064262 A | * | 6/2013 | |

\* cited by examiner

DISPLAY SUBSTRATE AND DISPLAY DEVICE

CROSS-REFERENCE TO RELATED APPLICATIONS

The present application is a U.S. National Stage Application under 35 U.S.C. § 371 of International Patent Application No. PCT/CN2018/124406, filed on Dec. 27, 2018, which claims priority to China Patent Application No. 201820558924.7 filed on Apr. 19, 2018, the disclosure of both of which are incorporated by reference herein in entirety.

TECHNICAL FIELD

The present disclosure relates to a display substrate and a display device.

BACKGROUND

The core principle of a TFT-LCD (Thin Film Transistor Liquid Crystal Display) is that the arrangement direction of liquid crystal molecules varies under the effect of an applied electric field, so that the flux of light transmitted through the liquid crystal is controlled. The display modes of the TFT-LCD mainly comprises a vertical alignment mode, a twisted nematic mode, and a planar field mode (for example, IPS (In-Plane Switching) or HADS (High-Advanced Dimension Switch), and the like). The HADS is a display mode for controlling the arrangement of liquid crystals within a cell by controlling an electric field generated between a top-layer strip electrode (as a common electrode) and a bottom-layer planar electrode (as a pixel electrode). Taking a dual-gate pixel display device as an example, the common electrode of the HADS-type TFT-LCD is strip-shaped.

SUMMARY

According to one aspect of embodiments of the present disclosure, a display substrate is provided. The display substrate comprises a common electrode comprising an electrode unit array, wherein the electrode unit array comprises a plurality of electrode units, each of which corresponds to two adjacent sub-pixels and comprises a boundary electrode line and an inner region defined by the boundary electrode line, the inner region comprising a first region and a second region, wherein: the first region comprises a plurality of first strip electrode lines having a same longitudinal direction, wherein two adjacent first strip electrode lines are not connected inside the first region; and the second region comprises a plurality of second strip electrode lines having a same longitudinal direction, wherein two adjacent second strip electrode lines are not connected inside the second region.

In some embodiments, the first region and the second region are arranged in a column direction of the electrode unit array, and in each of the plurality of electrode units, an angle defined by a longitudinal direction of the plurality of first strip electrode lines and a longitudinal direction of the plurality of second strip electrode lines is less than 90°.

In some embodiments, in each of the plurality of electrode units, the angle defined by the longitudinal direction of the plurality of first strip electrode lines and the longitudinal direction of the plurality of second strip electrode lines is an acute angle, and an angle defined by the longitudinal direction of the plurality of first strip electrode lines and a row direction of the electrode unit array is equal to an angle defined by the longitudinal direction of the plurality of second strip electrode lines and the row direction of the electrode unit array.

In some embodiments, in each of the plurality of electrode units, the longitudinal direction of the plurality of first strip electrode lines is the same as the longitudinal direction of the plurality of second strip electrode lines, and in two adjacent electrode units in a column direction of the electrode unit array, an angle defined by the longitudinal direction of the plurality of first strip electrode lines within one of the two adjacent electrode units and the longitudinal direction of the plurality of first strip electrode lines within the other of the two adjacent electrode units is an acute angle.

In some embodiments, the first region and the second region are arranged in a row direction of the electrode unit array, and in each of the plurality of electrode units, a longitudinal direction of the plurality of first strip electrode lines is the same as a longitudinal direction of the plurality of second strip electrode lines.

In some embodiments, each of the plurality of electrode units further comprises a strip connection part between the first region and the second region, wherein the strip connection part is connected to the plurality of first strip electrode lines and the plurality of second strip electrode lines respectively, and the strip connection part extends along a column direction of the electrode unit array.

In some embodiments, in two adjacent electrode units in a column direction of the electrode unit array, an angle defined by the longitudinal direction of the plurality of first strip electrode lines within one of the two adjacent electrode units and the longitudinal direction of the plurality of first strip electrode lines within the other of the two adjacent electrode units is an acute angle.

In some embodiments, in two adjacent electrode units in a column direction of the electrode unit array, an angle defined by the longitudinal direction of the plurality of first strip electrode lines within one of the two adjacent electrode units and a row direction of the electrode unit array is equal to an angle defined by the longitudinal direction of the plurality of first strip electrode lines within the other of the two adjacent electrode units and the row direction of the electrode unit array.

In some embodiments, in two adjacent electrode units in a row direction of the electrode unit array: a longitudinal direction of the plurality of first strip electrode lines within one of the two adjacent electrode units is the same as a longitudinal direction of the plurality of first strip electrode lines within the other of the two adjacent electrode units; and a longitudinal direction of the plurality of second strip electrode lines within the one of the two adjacent electrode units is the same as a longitudinal direction of the plurality of second strip electrode lines within the other of the two adjacent electrode units.

In some embodiments, the common electrode further comprises a plurality of row connection parts, each of which is connected between two adjacent electrode units in a row direction of the electrode unit array.

In some embodiments, all sub-pixels constitute a sub-pixel array; the display substrate further comprises data lines, each of which is disposed opposite to row connection parts in a same column, and each of which is connected to sub-pixels of two adjacent columns in the sub-pixel array.

In some embodiments, all sub-pixels constitute a sub-pixel array; the display substrate further comprises gate lines having an amount that is twice an amount of rows of the sub-pixel array, wherein each of the gate lines is connected to partial sub-pixels in a corresponding row of the sub-pixel array.

In some embodiments, the display substrate further comprises: a base substrate; a gate layer on the base substrate; a gate insulating layer on the gate layer and the base substrate; an active layer, a source layer and a drain layer on another side of the gate insulating layer opposite to a side of the gate layer, wherein the source layer and the drain layer are respectively connected to the active layer; a pixel electrode connected to the source layer or the drain layer; and a passivation layer covering the active layer, the source layer, the drain layer, and the pixel electrode, wherein the common electrode is on another side of the passivation layer opposite to a side of the pixel electrode.

According to another aspect of embodiments of the present disclosure, a display device is provided. The display device comprises the display substrate as described previously.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

Figure 1:
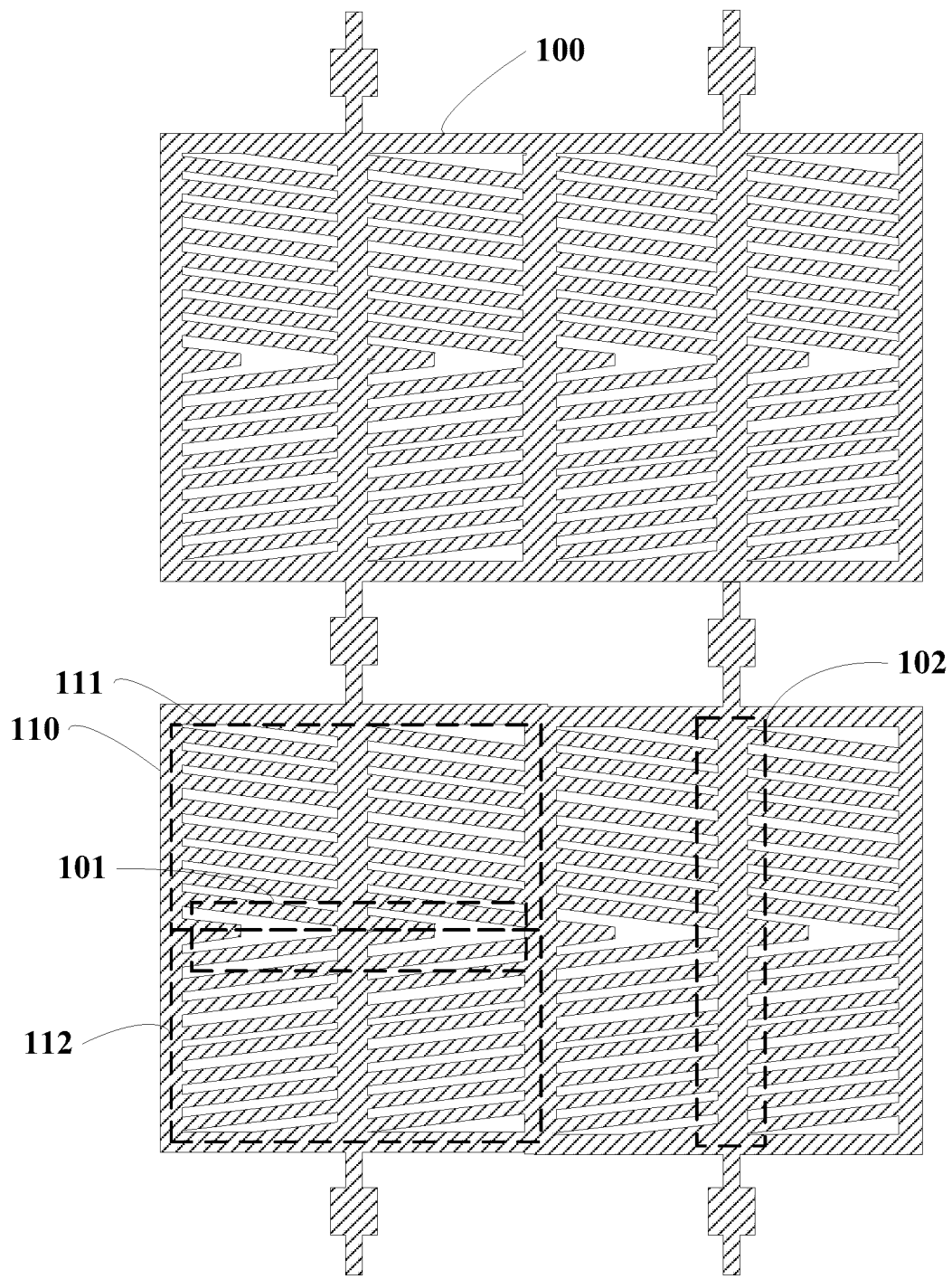
FIG. 1 is a schematic view schematically showing a common electrode of a display substrate according to an embodiment.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include" or similar words means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (comprising technical or scientific terms) used in the present disclosure have the same meanings as understood by those skilled in the art of the present disclosure unless otherwise defined. It is also to be understood that the terms defined in for example general-purpose dictionaries should be construed as having meanings consistent with those in the context of the related art, rather than being construed in an idealized or extremely formalized sense unless explicitly thus defined here.

Techniques, methods, and apparatus known to those of ordinary skill in the relevant art may not be discussed in detail, but where appropriate, these techniques, methods, and apparatuses should be considered as part of this specification.

FIG. 1 is a schematic view schematically showing a common electrode of a display substrate according to an embodiment.

As shown in FIG. 1, in a dual-gate pixel TFT-LCD of an HADS type, the entire common electrode 100 may comprise a plurality of electrode units 110 constituting an array, and each of the electrode units 110 may comprise two regions 111 and 112. The strip electrode lines within the two regions form a certain angle. A interface between the two regions is located at an intermediate position of each electrode unit in a row direction of the array. The region at the interface may be referred to as a-region 101. The inventors of the present disclosure have found that, during normal operation of a TFT-LCD, liquid crystal molecules corresponding to the a-region 101 will be affected by the electric fields of the regions 111 and 112 on both sides. However, since the fringe fields of the regions 111 and 112 on both sides have different directions, the liquid crystal molecules corresponding to the a-region 101 cannot be arranged orderly, so that a "black line" is formed in the a-region during the LCD display. Therefore, although the liquid crystal molecules corresponding to the a-region are in a pixel opening region (i.e., a region that is not blocked by a black matrix), the liquid crystal molecules have less contribution to the transmittance of the pixel.

Further, as shown in FIG. 1, at the intermediate position of each electrode unit 110 along a column direction of the array, there is a strip region 102. This strip region may be referred to as a b-region. The b-region 102 has a strip electrode line extending in the column direction of the array. The inventors of the present disclosure have found that, the strip electrode line in the b-region 102 results in that the electric field at the b-region is different from the normal electric fields in the regions 111 and 112, which results in that the liquid crystal molecules corresponding to the b-region 102 cannot be arranged orderly as well, so that the liquid crystal molecules have less contribution to the transmittance of the pixel.

In order to improve the transmittance of the pixel, embodiments of the present disclosure provide some display substrates. The structures of the display substrates according to some embodiments of the present disclosure will be described in detail below in conjunction with the accompanying drawings respectively.

Figure 2A:
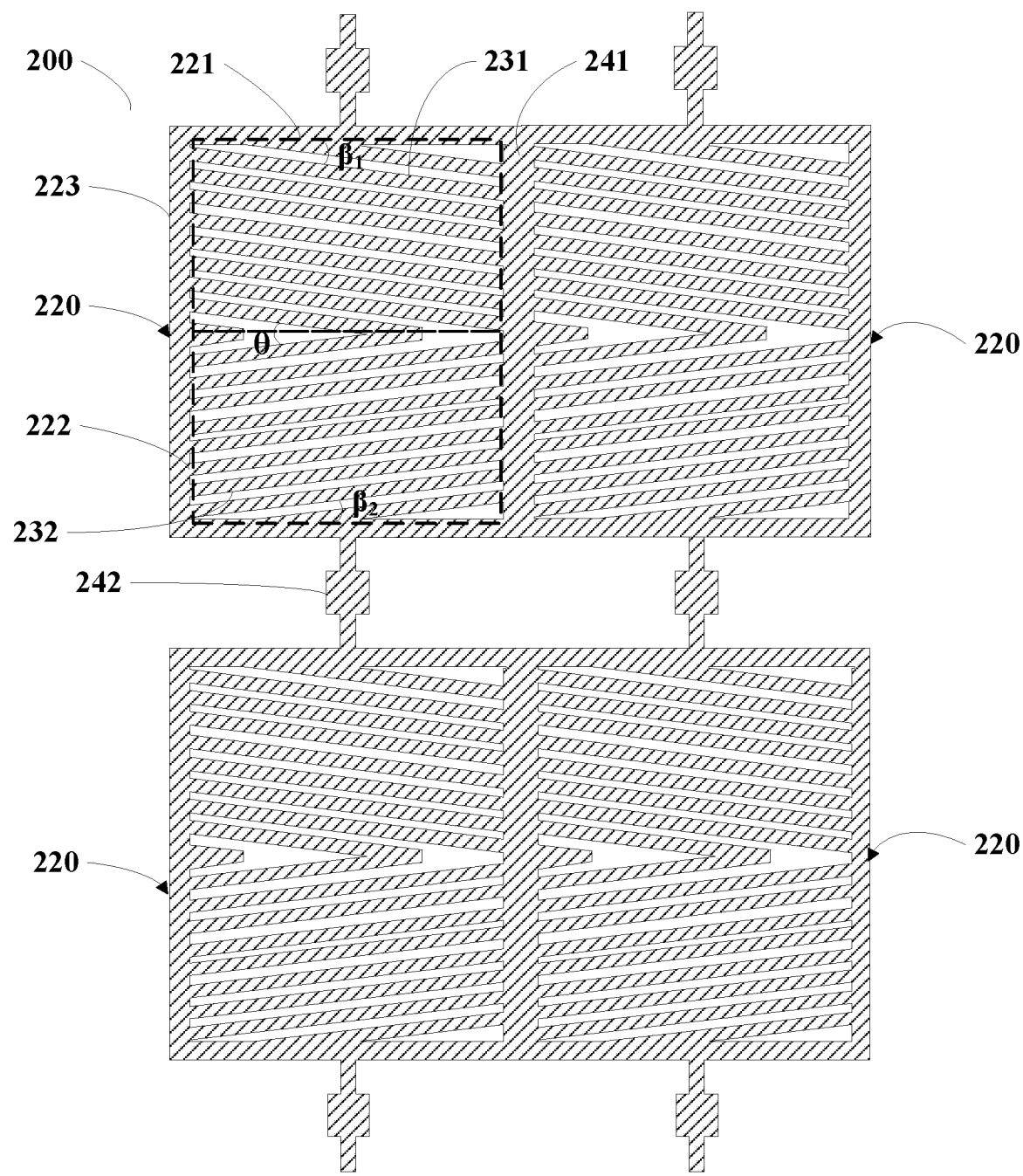
FIG. 2A is a schematic view schematically showing a common electrode of a display substrate according to an embodiment of the present disclosure.

FIG. 2A is a schematic view schematically showing a common electrode of a display substrate according to an embodiment of the present disclosure.

In some embodiments of the present disclosure, the display substrate may comprise a common electrode 200. For example, a material of the common electrode may be a conductive material such as ITO (Indium Tin Oxide). As shown in FIG. 2A, the common electrode 200 may comprise an electrode unit array. The electrode unit array may comprise a plurality of electrode units 220 (for example, four electrode units 220 are shown in FIG. 2A). Each of the plurality of electrode units 220 corresponds to two adjacent sub-pixels (not shown in FIG. 2A). Each of the plurality of electrode units 220 may comprise a boundary electrode line 223 and an inner region defined by the boundary electrode line 223. The inner region comprises a first region 221 and a second region 222.

As shown in FIG. 2A, the first region 221 may comprise a plurality of first strip electrode lines 231 having a same longitudinal direction. For example, in each first region, the plurality of first strip electrode lines 231 are parallel to each other. Two adjacent first strip electrode lines 231 are not connected inside the first region 221. For example, the two adjacent first strip electrode lines 231 are spaced inside the first region 221. However, the two adjacent first strip electrode lines 231 may be connected outside the first region 221 (for example, by the boundary electrode line 223 or the row connection part 241 which will be described later).

As shown in FIG. 2A, the second region 222 may comprise a plurality of second strip electrode lines 232 having a same longitudinal direction. For example, in each second region, the plurality of second strip electrode lines 232 are parallel to each other. Two adjacent second strip electrode lines 232 are not connected inside the second region 222. For example, the two adjacent second strip electrode lines 232 are spaced inside the second region 222. However, the two adjacent second strip electrode lines 232 may be connected outside the second region 222 (for example, by the boundary electrode line 223 or the row connection part 241 which will be described later).

In the display substrate of the above-described embodiments, a common electrode of the display substrate comprises an electrode unit array. The electrode unit array comprises a plurality of electrode units. Each of the plurality of electrode units corresponds to two adjacent sub-pixels. Each of the plurality of electrode units comprises a boundary electrode line and an inner region defined by the boundary electrode line. The inner region comprises a first region and a second region. The first region comprises a plurality of first strip electrode lines having a same longitudinal direction. Two adjacent first strip electrode lines are not connected inside the first region. The second region comprises a plurality of second strip electrode lines having a same longitudinal direction. Two adjacent second strip electrode lines are not connected inside the second region. In this way, at least one of the a-region or the b-region in the common electrode of the related art is removed, and the influence of at least one of the a-region or the b-region on the pixel transmittance is reduced, so that it is possible to improve the transmittance of the pixel in the open region.

For example, the structure of the b-region is removed in the common electrode shown in FIG. 2A, so that it is possible to reduce the influence of the b-region on the pixel transmittance. By research and calculation, it is indicated that, the common electrode shown in FIG. 2A may improve the pixel transmittance by 6% as compared with the common electrode shown in FIG. 1.

In some embodiments, as shown in FIG. 2A, the first region 221 and the second region 222 are arranged in a column direction of the electrode unit array. In each of the plurality of electrode units, an angle defined by a longitudinal direction of the plurality of first strip electrode lines and a longitudinal direction of the plurality of second strip electrode lines is less than 90°. For example, as shown in FIG. 2A, in each of the plurality of electrode units 220, the angle defined by the longitudinal direction of the plurality of first strip electrode lines 231 and the longitudinal direction of the plurality of second strip electrode lines 232 is an acute angle, i.e. an angle of θ as shown in FIG. 2A. For example, the range of the angle θ may be 4° to 30°. For example, the angle θ may be 10° or 15° or the like. In this way, the liquid crystal molecules corresponding to these first strip electrode lines may vary in one arrangement direction, and the liquid crystal molecules corresponding to the second strip electrode lines may vary in another arrangement direction, so that it is possible to improve a display view angle of the display device during the display.

In some embodiments, in each of the plurality of electrode units 220, an angle defined by the longitudinal direction of the plurality of first strip electrode lines 231 and a row direction of the electrode unit array is equal to an angle defined by the longitudinal direction of the plurality of second strip electrode lines 232 and the row direction of the electrode unit array. For example, as shown in FIG. 2A, the angle defined by the longitudinal direction of the first strip electrode line 231 and the row direction of the electrode unit array is an angle of $\beta_1$, and the angle defined by the longitudinal direction of the second strip electrode line 232 and the row direction of the electrode unit array is an angle of $\beta_2$, then the angle $\beta_1$=the angle $\beta_2$. This may make the left viewing angle of the display device is equal to the right viewing angle of the display device during the display of the display device.

In some embodiments, as shown in FIG. 2A, in two adjacent electrode units 220 in a row direction of the electrode unit array, the longitudinal direction of the plurality of first strip electrode lines 231 within one of the two adjacent electrode units is the same as the longitudinal direction of the plurality of first strip electrode lines 231 within the other of the two adjacent electrode units. In the two adjacent electrode units 220 in the row direction of the electrode unit array, the longitudinal direction of the plurality of second strip electrode lines 232 within the one of the two adjacent electrode units is the same as the longitudinal direction of the plurality of second strip electrode lines 232 in the other of the two adjacent electrode units. This may improve the transmittance of light.

In some embodiments, as shown in FIG. 2A, the common electrode may further comprise a plurality of row connection parts 241. Each of the plurality of row connection parts 241 is connected between two adjacent electrode units 220 in a row direction of the electrode unit array. The boundary electrode line 223 and the row connection part 241 may enclose the inner region of the electrode unit. For example, for the electrode unit at an edge of each row of the array, the inner region of the electrode unit may be enclosed by the boundary electrode line 223 and one row connection part 241. For another example, for the electrode unit at a non-edge of each row of the array, the inner region of the electrode unit may be enclosed by the boundary electrode line 223 and two row connection parts 241.

In some embodiments, as shown in FIG. 2A, the common electrode may further comprise a plurality of column connection parts 242. Each of the plurality of column connection parts 242 is connected between two adjacent electrode units 220 in a column direction of the electrode unit array.

In the above-described embodiments, these row connection parts 241 and column connection parts 242 connect all the electrode units 220 of the common electrode, so that all the electrode units of the common electrode are at a same potential during operation of the display substrate.

Figure 2B:
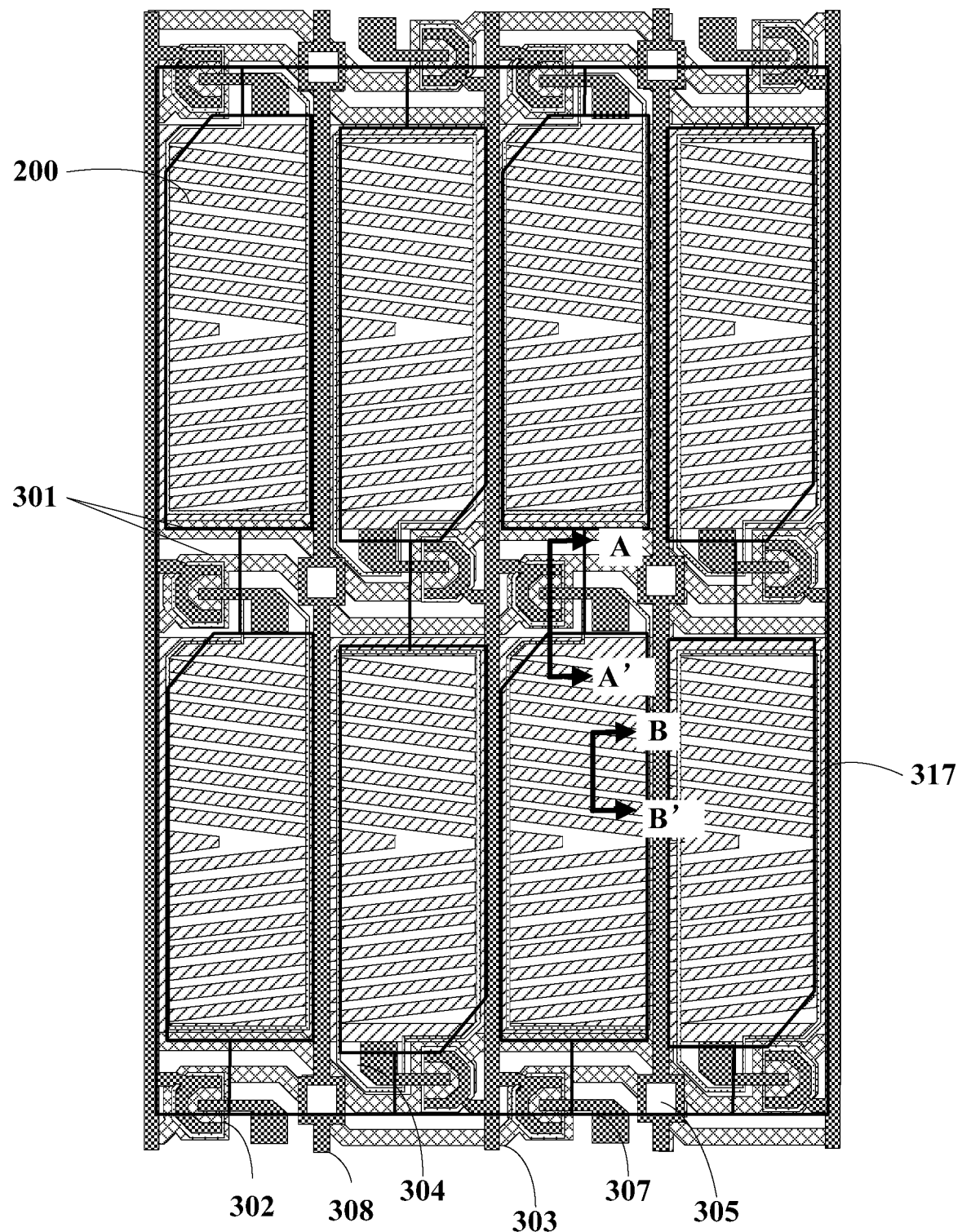
FIG. 2B is a schematic view schematically showing a display substrate according to an embodiment of the present disclosure.

FIG. 2B is a schematic view schematically showing a display substrate according to an embodiment of the present disclosure. The display substrate comprises, for example, the common electrode 200 shown in FIG. 2A.

In some embodiments, as shown in FIG. 2B, in the display substrate, all of the sub-pixels (each open region 317 corresponds to one sub-pixel) constitute a sub-pixel array. Each of the plurality of electrode units corresponds to two sub-pixels in a row direction of the sub-pixel array.

In some embodiments, as shown in FIG. 2B, the display substrate may further comprise data lines 303. Each of the data lines 303 is disposed opposite to row connection parts 241 in a same column. In the embodiment, by disposing the row connection part in the same column opposite to the data line, it is possible to reduce the influence of a data line signal on the liquid crystal, and avoid light leakage as much as possible. Each of the data lines 303 is connected to sub-pixels of two adjacent columns in the sub-pixel array. For example, each of the data lines 303 may be electrically connected to thin film transistors of a respective column of sub-pixels on both sides of the each of the data lines.

In some embodiments, as shown in FIG. 2B, the display substrate may further comprise gate lines 301. An amount of the gate lines 301 is twice an amount of rows of the sub-pixel array. Therefore, the display substrate may be referred to as a dual-gate pixel display substrate. Each of the gate lines 301 is connected to partial sub-pixels in a corresponding row of the sub-pixel array. For example, each of the gate lines 301 is electrically connected to thin film transistors of half the amount of sub-pixels in one row of sub-pixels corresponding to the each of the gate lines. The thin film transistors of the other half sub-pixels in the one row of sub-pixels is electrically connected to another gate line.

In some embodiments, as shown in FIG. 2B, the display substrate further comprises an active layer 302 of TFT, a passivation layer via hole 305, a black matrix (referred to as BM for short) 307, and a pixel electrode (e.g., ITO or the like) 304, and a common electrode connecting line 308. These structures may be located in different layer structures. Here, the common electrode connecting line 308 refers to a line connected to the common electrode 200. Each common electrode connecting line 308 is disposed opposite to a column connection part 242 in a same column.

Figure 3A:
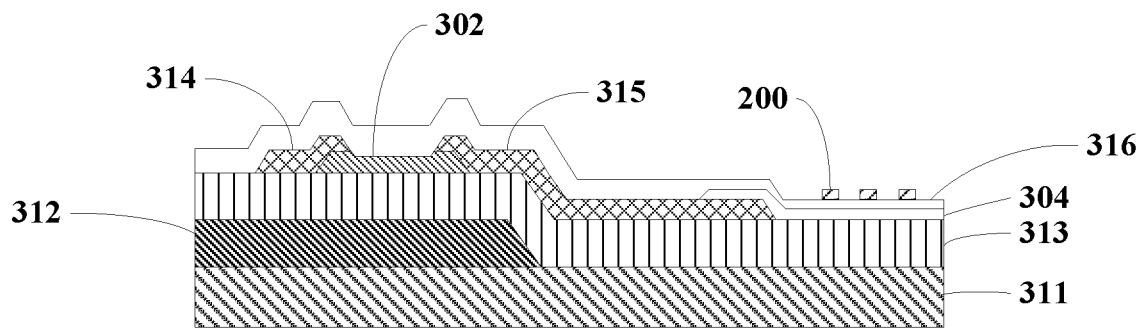
FIG. 3A is a cross-sectional view schematically showing a structure of the display substrate of FIG. 2B taken along a line A-A'.
Figure 3B:
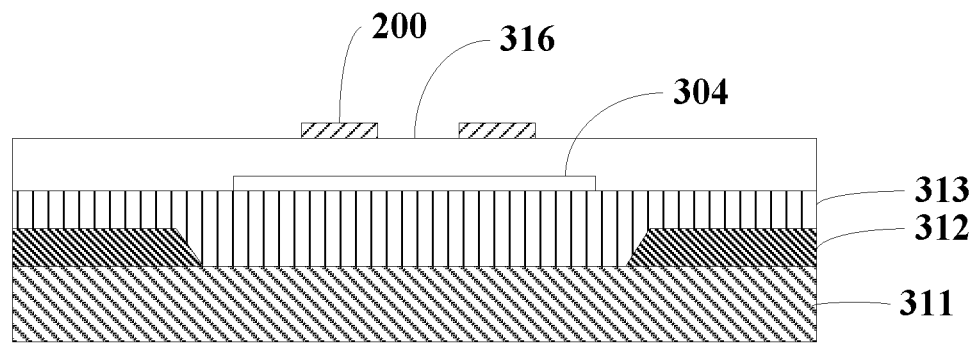
FIG. 3B is a cross-sectional view schematically showing a structure of the display substrate of FIG. 2B taken along a line B-B.

FIG. 3A is a cross-sectional view schematically showing a structure of the display substrate of FIG. 2B taken along a line A-A'. FIG. 3B is a cross-sectional view schematically showing a structure of the display substrate of FIG. 2B taken along a line B-B'.

As shown in FIGS. 3A and 3B, the display substrate may further comprise a base substrate (e.g., a glass substrate) 311, a gate layer 312, a gate insulating layer 313, a source layer 314, a drain layer 315, a passivation layer 316, and the like. As shown in FIG. 3A, the gate layer 312 is on the base substrate 311. The gate insulating layer 313 is on the gate layer 312 and the base substrate 311. The active layer 302, the source layer 314, and the drain layer 315 are on another side of the gate insulating layer 313 opposite to a side of the gate layer 312. The source layer 314 and the drain layer 315 are respectively connected to the active layer 302. The pixel electrode 304 is connected to the drain layer 315 (or the source layer 314). The passivation layer 316 covers the active layer 302, the source layer 314, the drain layer 315, and the pixel electrode 304. The common electrode 200 is on another side of the passivation layer 316 opposite to a side of the pixel electrode 304. During the operation of the display substrate, an electric field may be formed between the common electrode 200 and the pixel electrode 304, so that the arrangement direction of the liquid crystal molecules varies to play the effect of the display.

Figure 4A:
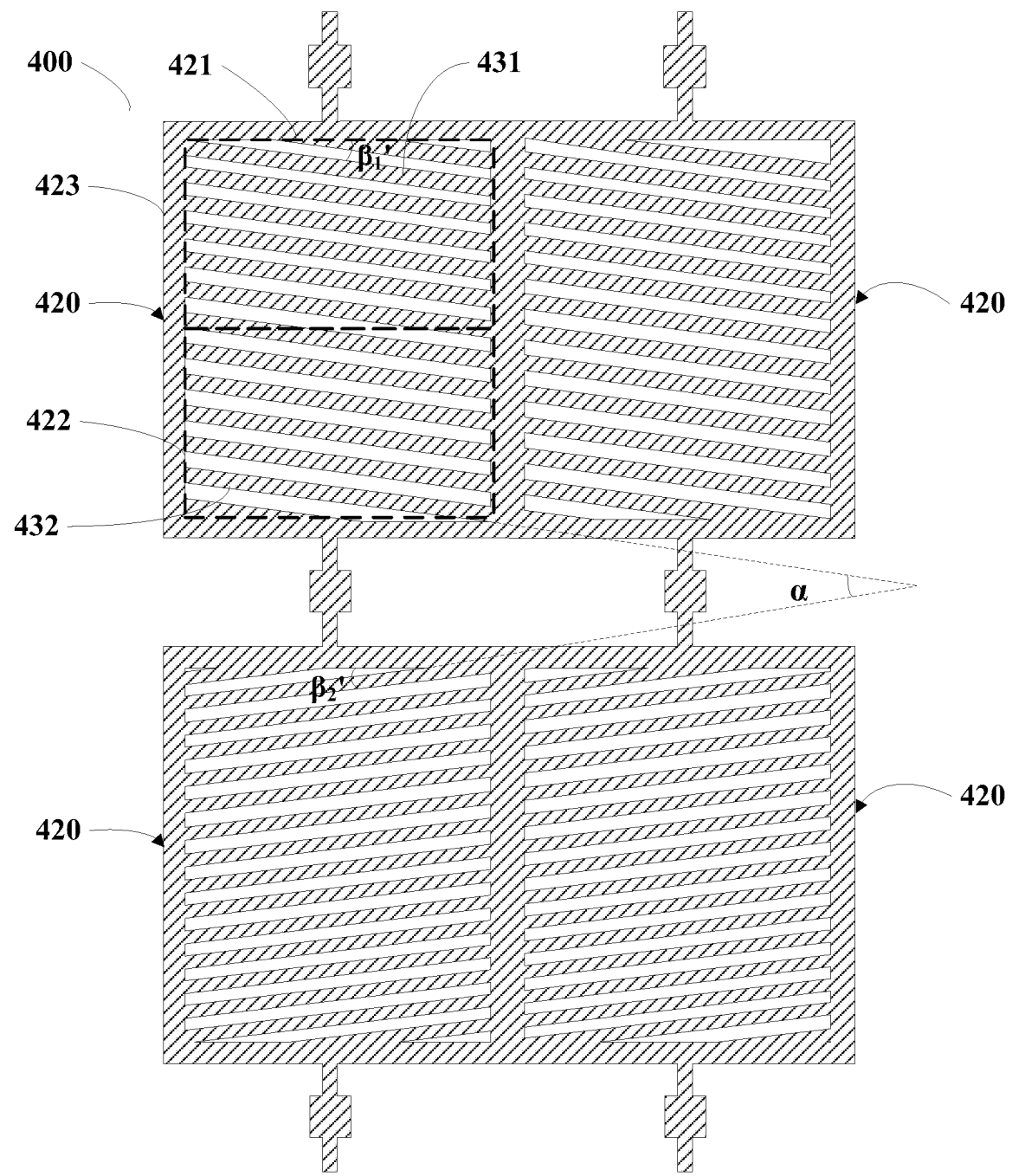
FIG. 4A is a schematic view schematically showing a common electrode of a display substrate according to another embodiment of the present disclosure.
Figure 4B:
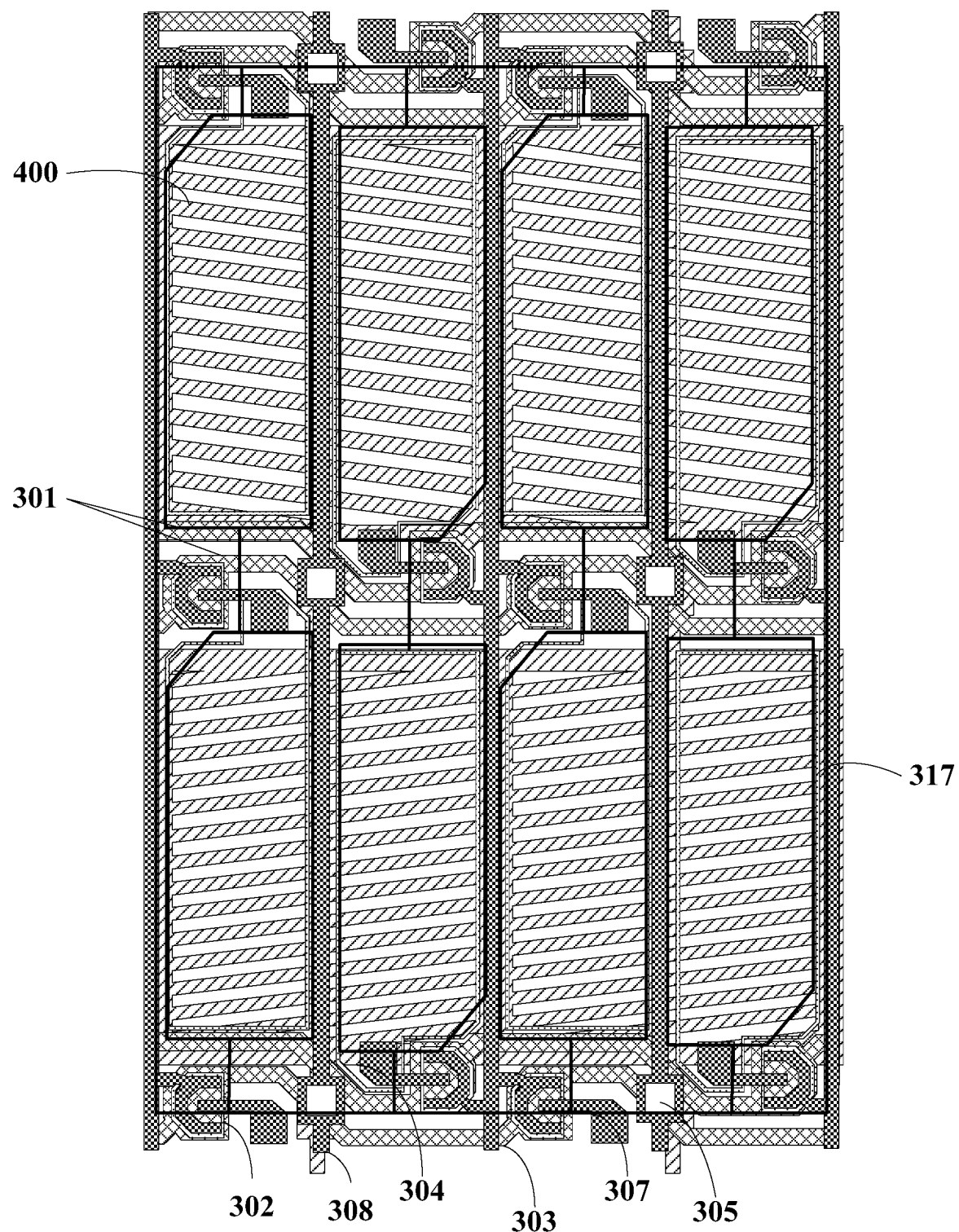
FIG. 4B is a schematic view schematically showing a display substrate according to another embodiment of the present disclosure.

FIG. 4A is a schematic view schematically showing a common electrode of a display substrate according to another embodiment of the present disclosure. FIG. 4B is a schematic view schematically showing a display substrate according to another embodiment of the present disclosure.

As shown in FIG. 4B, the display substrate may comprise a common electrode 400. As shown in FIGS. 4A and 4B, the common electrode 400 may comprise an electrode unit array. The electrode unit array may comprise a plurality of electrode units 420 (for example, four electrode units 420 are shown in FIG. 4A). Each of the plurality of electrode units 420 corresponds to two adjacent sub-pixels. Each of the plurality of electrode units 420 may comprise a boundary electrode line 423 and an inner region defined by the boundary electrode line 423. The inner region comprises a first region 421 and a second region 422.

As shown in FIG. 4A, the first region 421 may comprise a plurality of first strip electrode lines 431 having a same longitudinal direction. Two adjacent first strip electrode lines 431 are not connected inside the first region 421.

As shown in FIG. 4A, the second region 422 may comprise a plurality of second strip electrode lines 432 having a same longitudinal direction. Two adjacent second strip electrode lines 432 are not connected inside the second region 422.

As shown in FIG. 4A, the first region 421 and the second region 422 are arranged in a column direction of the electrode unit array. In each of the plurality of electrode units 420, the longitudinal direction of the plurality of first strip electrode lines 431 is the same as the longitudinal direction of the plurality of second strip electrode lines 432. In other words, in each of the plurality of electrode units, an angle defined by the longitudinal direction of the plurality of first strip electrode lines 431 and the longitudinal direction of the plurality of second strip electrode lines 432 is 0°.

In the display substrate of the above-described embodiments, the first region and the second region of each electrode unit of the common electrode are arranged along a column direction of the electrode unit array. Two adjacent first strip electrode lines are not connected inside the first region, and two adjacent second strip electrode lines are not connected inside the second region. Moreover, in each of the electrode units, a longitudinal direction of the first strip electrode line is the same as that of the second strip electrode line. In this way, the a-region and the b-region of the common electrode as shown in FIG. 1 are removed, and the influence of the a-region and the b-region on the pixel transmittance is reduced, so that it is possible to improve the transmittance of the pixel in the open region.

In some embodiments, as shown in FIG. 4A, in two adjacent electrode units 420 in a column direction of the electrode unit array, an angle defined by the longitudinal direction of the plurality of first strip electrode lines 431 within one of the two adjacent electrode units and the longitudinal direction of the plurality of first strip electrode lines 431 within the other of the two adjacent electrode units is an acute angle. The display viewing angle of the display device may be expanded by designing the acute angle in the common electrode.

It should be noted here that, in each of the plurality of electrode units 420, a longitudinal direction of the plurality of first strip electrode lines 431 is the same as that of the plurality of second strip electrode lines 432. Therefore, the descriptions of the above-described embodiments may also be understood in a way such that: in the two adjacent electrode units 420 in a column direction of the electrode unit array, an angle defined by the longitudinal direction of the plurality of first strip electrode lines 431 within one of the two adjacent electrode units and the longitudinal direction of the plurality of second strip electrode lines 432 within the other of the two adjacent electrode units is an acute angle, for example an angle of a as shown in FIG. 4A. For example, the range of the angle α may be 4° to 30°. For example, the angle α may be 10° or 15° or the like. Or, the descriptions of the above-described embodiments may also be understood in a way such that: in the two adjacent electrode units 420 in a column direction of the electrode unit array, an angle defined by the longitudinal direction of the plurality of second strip electrode lines 432 within one of the two adjacent electrode units and the longitudinal direction of the plurality of second strip electrode lines 432 within the other of the two adjacent electrode units is an acute angle.

In some embodiments, in two adjacent electrode units 420 in a column direction of the electrode unit array, an angle defined by the longitudinal direction of the plurality of first strip electrode lines 431 within one of the two adjacent electrode units and a row direction of the electrode unit array is equal to an angle defined by the longitudinal direction of the plurality of first strip electrode lines 431 within the other of the two adjacent electrode units and the row direction of the electrode unit array. For example, as shown in FIG. 4A, in the two adjacent electrode units 420 in the column direction of the electrode unit array, the angle defined by the longitudinal direction of the first strip electrode line 431 within one electrode unit and the row direction of the electrode unit array is an angle of $\beta_1'$, and the angle defined by the longitudinal direction of the first strip electrode line 431 within the other electrode unit and the row direction of the electrode unit array is an angle of $\beta_2'$, then the angle $\beta_1'$=the angle $\beta_2'$. This may make the left viewing angle of the display device is equal to the right viewing angle of the display device during the display of the display device.

It should be noted that, the display substrate shown in FIG. 4B has a structure that is the same as or similar to the display substrate shown in FIG. 2B, and details will not be repeated here.

Figure 5A:
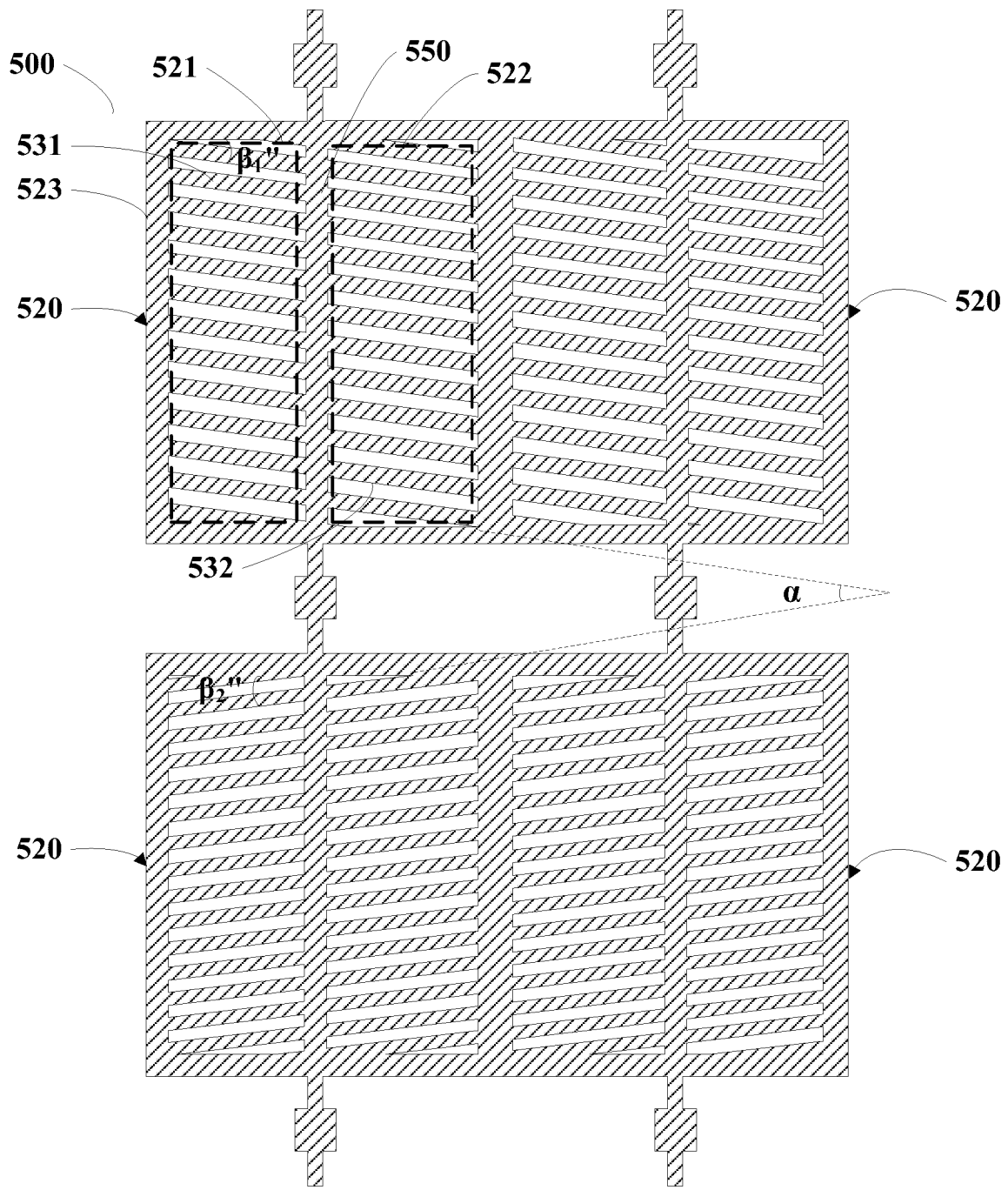
FIG. 5A is a schematic view schematically showing a common electrode of a display substrate according to another embodiment of the present disclosure.
Figure 5B:
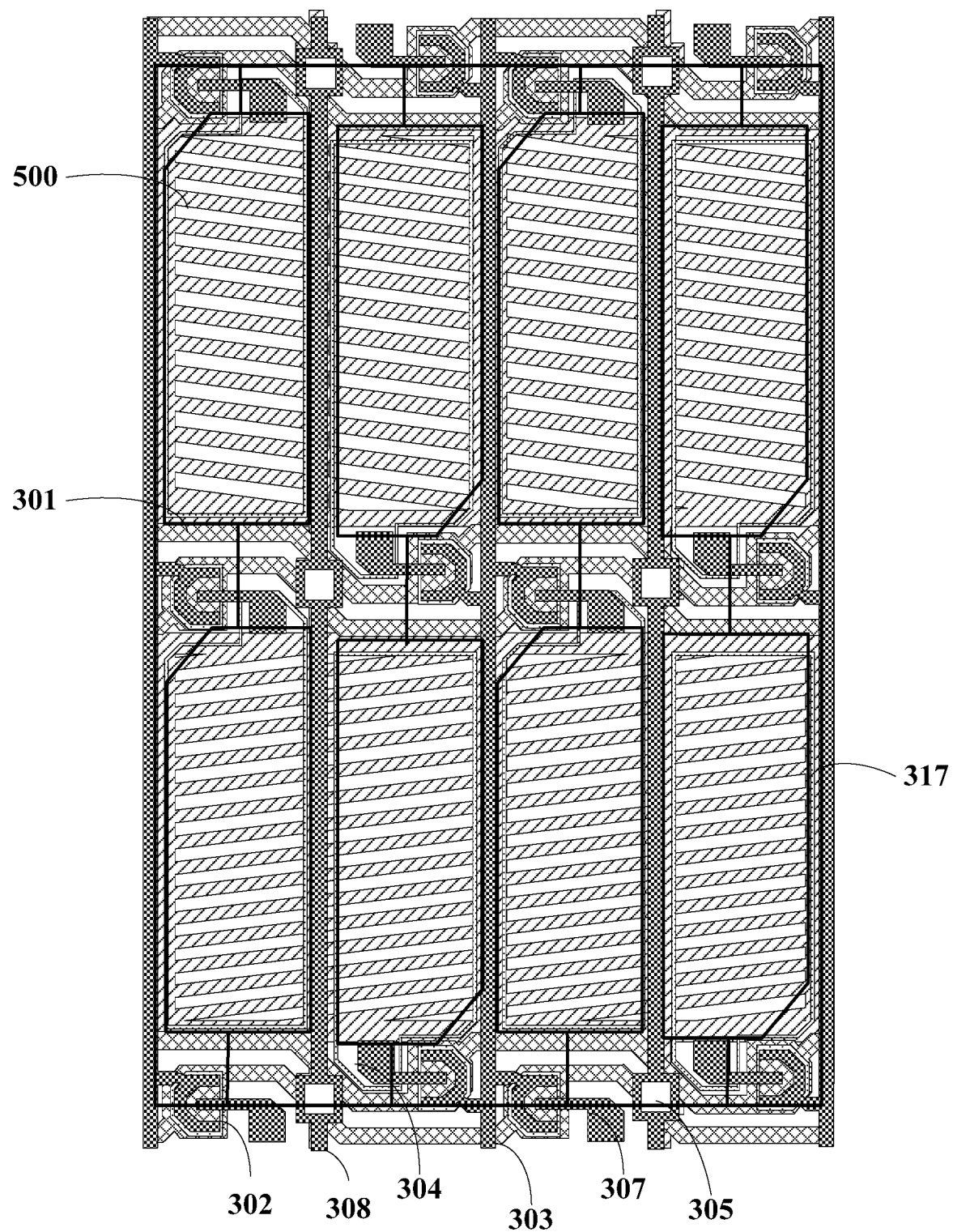
FIG. 5B is a schematic view schematically showing a display substrate according to another embodiment of the present disclosure.

FIG. 5A is a schematic view schematically showing a common electrode of a display substrate according to another embodiment of the present disclosure. FIG. 5B is a schematic view schematically showing a display substrate according to another embodiment of the present disclosure.

As shown in FIG. 5B, the display substrate may comprise a common electrode 500. As shown in FIGS. 5A and 5B, the common electrode 500 may comprise an electrode unit array. The electrode unit array may comprise a plurality of electrode units 520 (for example, four electrode units 520 are shown in FIG. 5A). Each of the plurality of electrode units 520 corresponds to two adjacent sub-pixels. Each of the plurality of electrode units 520 may comprise a boundary electrode line 523 and an inner region defined by the boundary electrode line 523. The inner region comprises a first region 521 and a second region 522.

As shown in FIG. 5A, the first region 521 may comprise a plurality of first strip electrode lines 531 having a same longitudinal direction. Two adjacent first strip electrode lines 531 are not connected inside the first region 521.

As shown in FIG. 5A, the second region 522 may comprise a plurality of second strip electrode lines 532 having a same longitudinal direction. Two adjacent second strip electrode lines 532 are not connected inside the second region 522.

As shown in FIG. 5A, the first region 521 and the second region 522 are arranged in a row direction of the electrode unit array. In each of the plurality of electrode units 520, the longitudinal direction of the plurality of first strip electrode lines 531 is the same as that of the plurality of second strip electrode lines 532.

In some embodiments, as shown in FIG. 5A, each of the plurality of electrode units 520 may further comprise a strip connection part 550 between the first region 521 and the second region 522. The strip connection part 550 is connected to the plurality of first strip electrode lines 531 and the plurality of second strip electrode lines 532 respectively. The strip connection part 550 extends along a column direction of the electrode unit array.

In the display substrate of the above-described embodiments, the first region and the second region of each electrode unit of the common electrode are arranged along a row direction of the electrode unit array. Two adjacent first strip electrode lines are not connected inside the first region, and two adjacent second strip electrode lines are not connected inside the second region. Moreover, the electrode unit further comprises a strip connection part between the first region and the second region. In this way, the a-region of the common electrode as shown in FIG. 1 is removed, and the influence of the a-region on the pixel transmittance is reduced, so that it is possible to improve the transmittance of the pixel in the open region.

In some embodiments, as shown in FIG. 5A, in two adjacent electrode units 520 in a column direction of the electrode unit array, an angle defined by the longitudinal direction of the plurality of first strip electrode lines 531 within one of the two adjacent electrode units and the longitudinal direction of the plurality of first strip electrode lines 531 within the other of the two adjacent electrode units is an acute angle. Similar to the foregoing, the display viewing angle of the display device may be expanded by designing the acute angle in the common electrode.

It should be noted here that, in each of the plurality of electrode units 520, a longitudinal direction of the plurality of first strip electrode lines 531 is the same as that of the plurality of second strip electrode lines 532. Therefore, the descriptions of the above-described embodiments may also be understood in a way such that: in the two adjacent electrode units 520 in a column direction of the electrode unit array, an angle defined by the longitudinal direction of the plurality of first strip electrode lines 531 within one of the two adjacent electrode units and the longitudinal direction of the plurality of second strip electrode lines 532 within the other of the two adjacent electrode units is an acute angle. Or, the descriptions of the above-described embodiments may also be understood in a way such that: in the two adjacent electrode units 520 in a column direction of the electrode unit array, an angle defined by the longitudinal direction of the plurality of second strip electrode lines 532 within one of the two adjacent electrode units and the longitudinal direction of the plurality of second strip electrode lines 532 within the other of the two adjacent electrode units is an acute angle, for example an angle of a as shown in FIG. 5A.

In some embodiments, in two adjacent electrode units 520 in a column direction of the electrode unit array, an angle defined by the longitudinal direction of the plurality of first strip electrode lines 531 within one of the two adjacent electrode units and a row direction of the electrode unit array is equal to an angle defined by the longitudinal direction of the plurality of first strip electrode lines 531 within the other of the two adjacent electrode units and the row direction of the electrode unit array. For example, as shown in FIG. 5A, in the two adjacent electrode units 520 in a column direction of the electrode unit array, the angle defined by the longitudinal direction of the first strip electrode line 531 within one electrode unit and the row direction of the electrode unit array is an angle of $\beta_1''$, and the angle defined by the longitudinal direction of the first strip electrode line 531 within the other electrode unit and the row direction of the electrode unit array is an angle of $\beta_2''$, then the angle $\beta_1''$=the angle $\beta_2''$. This may make the left viewing angle of the display device is equal to the right viewing angle of the display device during the display of the display device.

It should be noted that, the display substrate shown in FIG. 5B has a structure that is the same as or similar to the display substrate shown in FIG. 2B, and details will not be repeated here. In addition, the above-described display substrate may be an array substrate.

In some embodiments of the present disclosure, a display device is also provided. The display device may comprise the display substrate as described previously, such as the display substrate as shown in FIG. 2B, 4B or 5B. The display device may be any product or member having a display function, such as a liquid crystal display panel, electronic paper, a mobile phone, a tablet computer, a television, a display, a notebook computer, a digital photo frame, a navigator, or the like.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features may be made without departing from the scope and spirit of the present disclosure. The scope of the disclosure is defined by the following claims.

What is claimed is:

1. A display substrate, wherein the display substrate is a dual-gate pixel display substrate and comprises:
   a common electrode comprising an electrode unit array, wherein the electrode unit array comprises a plurality of electrode units, each of which corresponds to two adjacent sub-pixels and comprises a boundary electrode line and an inner region defined by the boundary electrode line, the inner region comprising a first region and a second region, wherein:
   the first region comprises a plurality of first strip electrode lines having a same longitudinal direction, in which two adjacent first strip electrode lines are not connected inside the first region; and
   the second region comprises a plurality of second strip electrode lines having a same longitudinal direction, in which two adjacent second strip electrode lines are not connected inside the second region;
   wherein the common electrode further comprises a plurality of row connection parts, each of the plurality of row connection parts being connected between two adjacent electrode units in a row direction of the electrode unit array, the each of the plurality of row connection parts extending continuously from one end of an area between the two adjacent electrode units to another end of the area along a column direction of the electrode unit array, and a shape of each of the plurality of row connection parts being a straight line shape; and at least one of the plurality of first strip electrode lines in the first region and at least one of the plurality of second strip electrode lines in the second region extend into a sub-pixel of an adjacent column;
   wherein the first region and the second region are arranged in a column direction of the electrode unit array, and
   in each of the plurality of electrode units, an angle defined by a longitudinal direction of the plurality of first strip electrode lines and a longitudinal direction of the plurality of second strip electrode lines is less than 90°.

2. The display substrate according to claim 1, wherein in each of the plurality of electrode units, the angle defined by the longitudinal direction of the plurality of first strip electrode lines and the longitudinal direction of the plurality of second strip electrode lines is an acute angle, and an angle defined by the longitudinal direction of the plurality of first strip electrode lines and a row direction of the electrode unit array is equal to an angle defined by the longitudinal direction of the plurality of second strip electrode lines and the row direction of the electrode unit array.

3. The display substrate according to claim 1, wherein in two adjacent electrode units in a row direction of the electrode unit array:
   a longitudinal direction of the plurality of first strip electrode lines within one of the two adjacent electrode units is the same as a longitudinal direction of the plurality of first strip electrode lines within the other of the two adjacent electrode units; and a longitudinal direction of the plurality of second strip electrode lines within the one of the two adjacent electrode units is the same as a longitudinal direction of the plurality of second strip electrode lines within the other of the two adjacent electrode units.

4. The display substrate according to claim 1, wherein all sub-pixels constitute a sub-pixel array; and
the display substrate further comprises data lines, each of which is disposed opposite to row connection parts in a same column, and each of which is connected to sub-pixels of two adjacent columns in the sub-pixel array.

5. The display substrate according to claim 1, wherein all sub-pixels constitute a sub-pixel array; and
the display substrate further comprises gate lines having an amount that is twice an amount of rows of the sub-pixel array, wherein each of the gate lines is connected to partial sub-pixels in a corresponding row of the sub-pixel array.

6. The display substrate according to claim 1, further comprising:
a base substrate;
a gate layer on the base substrate;
a gate insulating layer on the gate layer and the base substrate;
an active layer, a source layer and a drain layer on another side of the gate insulating layer opposite to a side of the gate layer, wherein the source layer and the drain layer are respectively connected to the active layer;
a pixel electrode connected to the source layer or the drain layer; and
a passivation layer covering the active layer, the source layer, the drain layer, and the pixel electrode, wherein the common electrode is on another side of the passivation layer opposite to a side of the pixel electrode.

7. A display device, comprising: the display substrate according claim 1.

* * * * *